(12) United States Patent
Pires Sousa et al.

(10) Patent No.: US 12,515,607 B2
(45) Date of Patent: Jan. 6, 2026

(54) AIRBAG FOR A VEHICLE OCCUPANT RESTRAINT SYSTEM, METHOD FOR THE PRODUCTION THEREOF AND AIRBAG MODULE AND VEHICLE STEERING WHEEL WITH AN AIRBAG OF THIS TYPE

(71) Applicants: Dalphi Metal España SLU, Vigo (ES); SAFE LIFE INDUSTRIA DE COMPONENTES DE SEGURANCA AUTOMOVEL LDA, Gemieira (PT); ZF AUTOMOTIVE SAFETY GERMANY GMBH, Aschaffenburg (DE)

(72) Inventors: Cátia Celeste Pires Sousa, Melgaço (PT); João Duarte Amorim Correia, Viana do Castelo (PT); Bartolomeu Franco, Viana do Castelo (PT); Javier Boullosa, Vigo (ES); Andreas Joachim Maria Jonietz, Vigo (ES)

(73) Assignees: Dalphi Metal España SLU, Vigo (ES); SAFE LIFE INDUSTRIA DE COMPONENTES DE SEGURANCA AUTOMOVEL LDA, Gemiera (PT); ZF AUTOMOTIVE SAFETY, GERMANY GMBH, Aschaffenburg (DE)

( * ) Notice: Subject to any disclaimer, the term of this patent is extended or adjusted under 35 U.S.C. 154(b) by 0 days.

(21) Appl. No.: 18/851,755

(22) PCT Filed: Mar. 29, 2023

(86) PCT No.: PCT/EP2023/058149
§ 371 (c)(1),
(2) Date: Sep. 27, 2024

(87) PCT Pub. No.: WO2023/186986
PCT Pub. Date: Oct. 5, 2023

(65) Prior Publication Data
US 2025/0214526 A1    Jul. 3, 2025

(30) Foreign Application Priority Data
Mar. 30, 2022   (DE) ............... 10 2022 107 566.4

(51) Int. Cl.
*B60R 21/203*    (2006.01)
*B60R 21/2346*   (2011.01)

(52) U.S. Cl.
CPC ........ *B60R 21/203* (2013.01); *B60R 21/2346* (2013.01)

(58) Field of Classification Search
CPC .............. B60R 21/203; B60R 21/2035; B60R 21/2346
See application file for complete search history.

(56) References Cited

U.S. PATENT DOCUMENTS 5,165,716 A * 11/1992 Imai ..................... B60R 21/233
280/730.1
5,573,270 A    11/1996 Sogi et al.
(Continued)

FOREIGN PATENT DOCUMENTS

DE    602004004737 T2    6/2007
DE    102018129577 A1    5/2020
(Continued)

OTHER PUBLICATIONS

International Search Report for corresponding Application No. PCT/EP2023/058149 with a mailing date of Jul. 14, 2023, 26 pages.

*Primary Examiner* — Laura Freedman
(74) *Attorney, Agent, or Firm* — Tarolli, Sundheim, Covell & Tummino LLP

(57) ABSTRACT

The invention relates to an airbag (20) for a vehicle occupant restraint system, comprising an airbag rear wall (24) which
(Continued)

includes an airbag mouth (26) for inflating the airbag (20) as well as plural rear wall openings (28) distributed around the airbag mouth (26) for receiving fastening bolts (30), and comprising a flexible diffusor (32) which has a central cover portion (34), as well as plural connecting arms (36) each extending from the central cover portion (34) to a free end (38), the free ends (38) of the connecting arms (36) including diffusor fastening holes (40) for receiving fastening bolts (30), wherein the ends (38) of the connecting arms (36) are disposed on an inner face (42) of the airbag rear wall (24) so that the diffusor fastening holes (40) are aligned with the rear wall openings (28), and two respective diffusor fastening holes (40) of different overlapping connecting arms (36) come to lie on each of the rear wall openings (28), and wherein the connecting arms (36) overlapping in the area of a rear wall opening (28) are connected tightly to each other and tightly to the airbag rear wall (24). The invention further relates to a method for manufacturing the airbag (20) as well as an airbag module (14) and a vehicle steering wheel (10) comprising such an airbag (20).

16 Claims, 6 Drawing Sheets

(56) References Cited

U.S. PATENT DOCUMENTS

| | | | | |
|---|---|---|---|---|
| 5,678,858 A * | 10/1997 | Nakayama | ......... | B60R 21/2338 |
| | | | | 280/743.2 |
| 5,775,725 A * | 7/1998 | Hodac | ......... | B60R 21/2037 |
| | | | | 411/348 |
| 6,209,911 B1 * | 4/2001 | Igawa | ......... | B60R 21/2346 |
| | | | | 280/743.1 |
| 6,217,067 B1 * | 4/2001 | Derrick | ......... | B60R 21/233 |
| | | | | 280/743.1 |
| 6,382,662 B1 | 5/2002 | Igawa | | |
| 6,612,609 B1 * | 9/2003 | Rodriguez | ......... | B60R 21/201 |
| | | | | 280/743.1 |
| 6,648,366 B2 * | 11/2003 | Dillon | ......... | B60R 21/2346 |
| | | | | 280/740 |
| 6,834,884 B2 * | 12/2004 | Gu | ......... | B60R 21/2346 |
| | | | | 280/743.1 |
| 7,083,185 B2 * | 8/2006 | Fangmann | ......... | B60R 21/217 |
| | | | | 280/740 |
| 7,445,238 B2 * | 11/2008 | Marriott | ......... | B60R 21/26 |
| | | | | 280/740 |
| 7,618,060 B2 * | 11/2009 | Harvey | ......... | B60R 21/261 |
| | | | | 280/743.1 |
| 9,387,822 B2 * | 7/2016 | Iida | ......... | B60R 21/2346 |
| 10,358,110 B2 * | 7/2019 | Ooka | ......... | B60R 21/2346 |
| 11,180,103 B2 * | 11/2021 | Hess | ......... | B60R 21/2338 |
| 11,472,363 B2 * | 10/2022 | Koizumi | ......... | B60R 21/203 |
| 2005/0116455 A1 | 6/2005 | Abe et al. | | |

FOREIGN PATENT DOCUMENTS

| | | | |
|---|---|---|---|
| DE | 10151197 A1 | 5/2022 | |
| EP | 0930201 B1 | 7/2006 | |
| JP | 2011126307 A * | 6/2011 | ......... B60R 21/2346 |

* cited by examiner

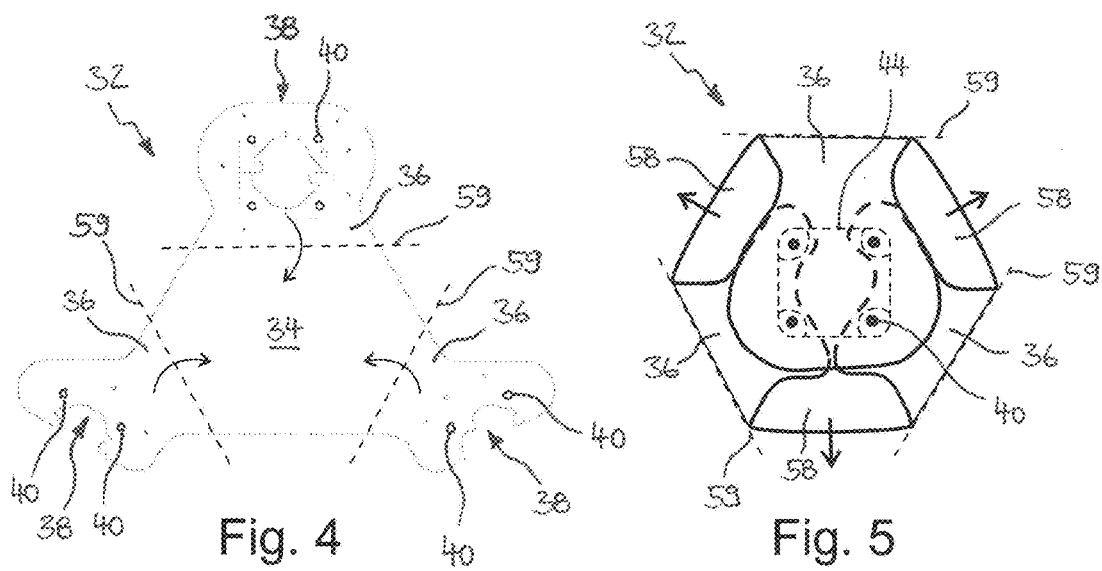
Fig. 4　　Fig. 5
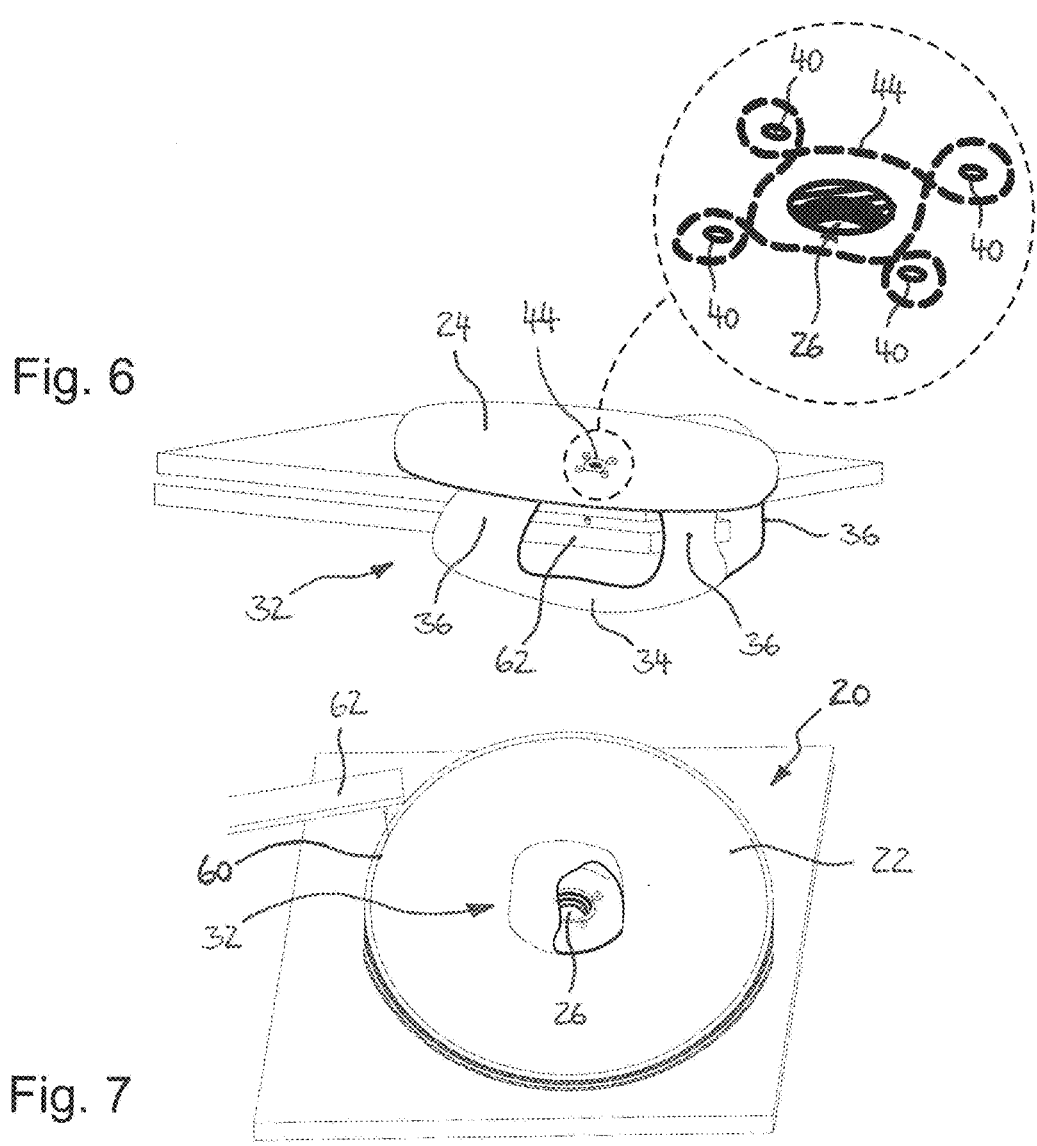
Fig. 6
Fig. 7

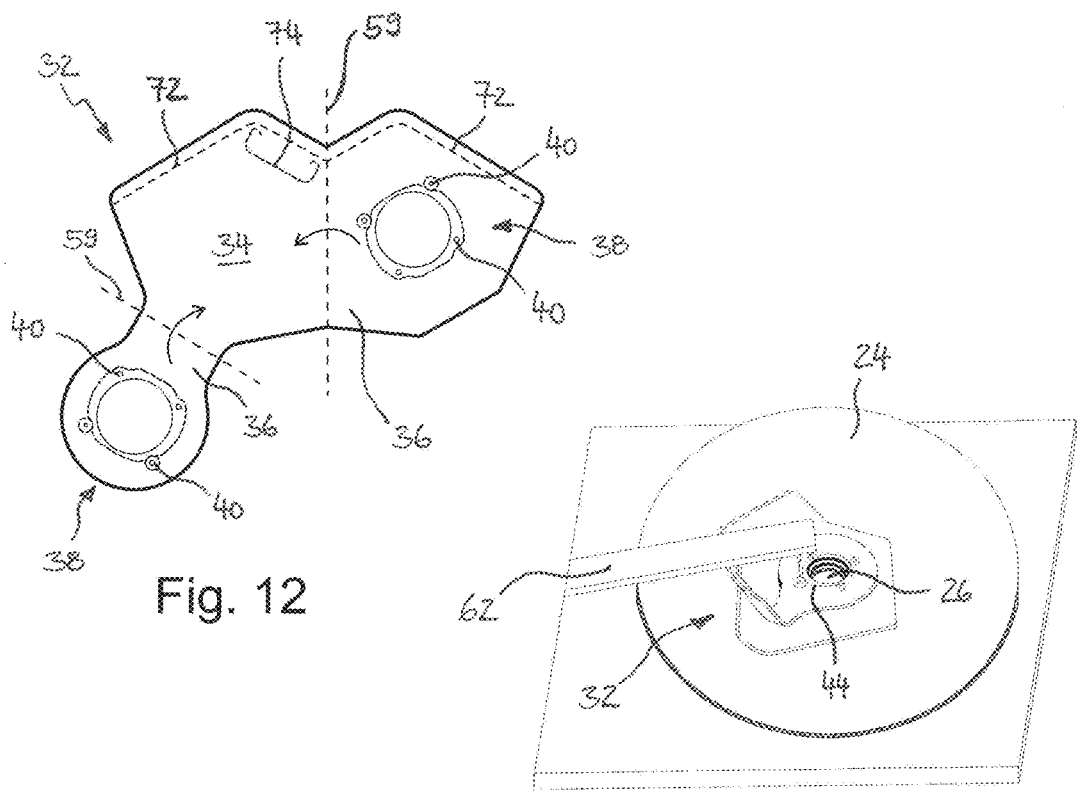
Fig. 12
Fig. 13
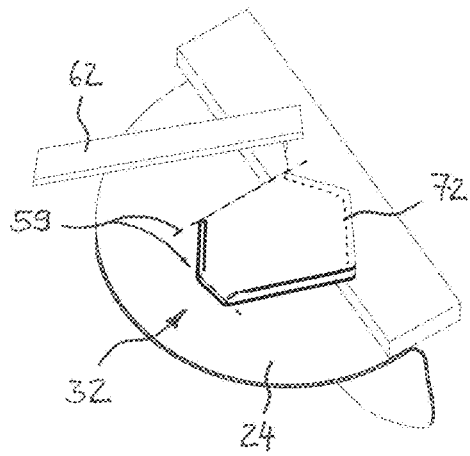
Fig. 14
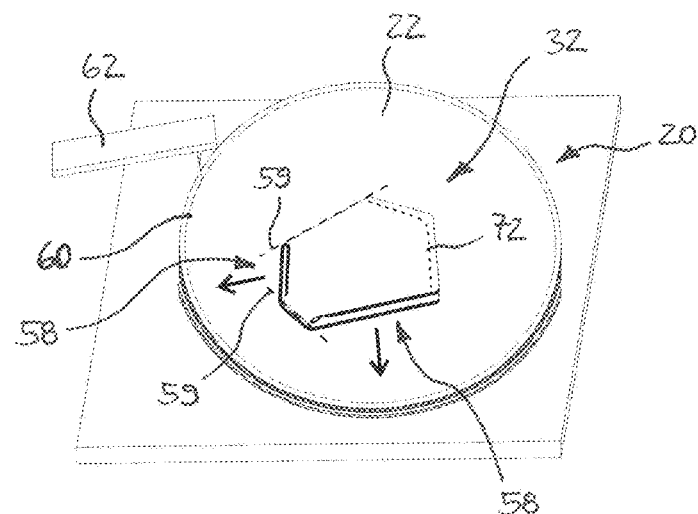
Fig. 15

AIRBAG FOR A VEHICLE OCCUPANT RESTRAINT SYSTEM, METHOD FOR THE PRODUCTION THEREOF AND AIRBAG MODULE AND VEHICLE STEERING WHEEL WITH AN AIRBAG OF THIS TYPE

RELATED APPLICATIONS

This application is a U.S. National Stage Application filed under 35 USC 371. claiming priority to Serial No. PCT/EP2023/058149, filed on 29 Mar. 2023; which claims priority from DE Patent Application 10 2022 107 566.4, filed 30 Mar. 2022, the entireties of which are hereby incorporated herein by reference.

TECHNICAL FIELD

The invention relates to an airbag for a vehicle occupant restraint system, to a method for manufacturing the same as well as to an airbag module and a vehicle steering wheel comprising such airbag.

BACKGROUND

Airbags are used as a part of airbag modules in the hub area of vehicle steering wheels, for example, and are quickly inflated in the event of a vehicle crash by means of a gas generator to dampen impact of an occupant and to protect the vehicle occupant against serious injuries.

Usually, airbags are filled through an opening also referred to as airbag mouth and are connected to a module housing at the opening edge and are mounted, via the module housing, to a module carrier such as to a steering wheel body. Due to the rapid filling and deployment of the airbag, high tensile forces which may result in the airbag tearing and in inadvertent gas leaks occur at the opening edge. To avoid this, reinforcing layers which are disposed at the edge of the airbag mouth are known already from the state of the art. Frequently, two or more reinforcing layers are provided which ensure safe and reliable fastening of the airbag on the module housing when the airbag module has been activated.

Further, from EP 0 930 201 B1 or U.S. Pat. No. 5,573,270 A, already flexible diffusor elements are known by which a deployment operation of the airbag can be controlled in a desired way and/or the airbag can be protected, at the beginning of its deployment, from damage by hot generator gas.

The reinforcing layers and flexible diffusor elements suggested in the state of the art contribute to high manufacturing effort for the airbag, however, resulting in an undesirably time-consuming and costly airbag production.

SUMMARY

Therefore, it is the object of the invention to provide an airbag having a specifically simple structural design which nevertheless can be fastened safely and reliably and enables a desired control of the deployment operation.

In accordance with the invention, this object is achieved by an airbag for a vehicle occupant restraint system, comprising an airbag rear wall which has an airbag mouth for inflating the airbag as well as plural rear wall openings distributed around the airbag mouth for receiving fastening bolts, and comprising a flexible diffusor which has a central cover portion, as well as plural connecting arms each of which extends from the central cover portion to a free end, wherein the free ends of the connecting arms include diffusor fastening holes for receiving fastening bolts, wherein the free ends of the connecting arms are disposed on an inner face of the airbag rear wall such that the diffusor fastening holes are aligned with the rear wall openings and two diffusor fastening holes of different overlapping connecting arms come to lie on each of the rear wall openings, and wherein the connecting arms overlapping in the area of a rear wall opening are connected tightly to each other as well as tightly to the airbag rear wall. In this case, the diffusor also adopts a reinforcing function when the airbag is connected in the area of the airbag mouth. Separate reinforcing layers can be completely dispensed with or can be reduced at least in terms of their number, allowing the number of the airbag components and, thus, also the manufacturing effort for the airbag to be reduced.

In a preferred embodiment of the airbag, all connecting arms and the airbag rear wall are connected by one single seam, the seam surrounding, specifically completely enclosing, the airbag mouth.

This seam can individually enclose additionally one of the rear wall openings, specifically each of the rear wall openings. To connect all connecting arms and the airbag rear wall by only one single seam also contributes to a particularly low manufacturing effort for the airbag. Enclosing individual, specifically all rear wall openings, after activation of the vehicle occupant restraint system, impedes tearing out of the rear wall openings so that an extremely robust airbag design is resulting.

According to a particularly preferred embodiment of the airbag, the flexible diffusor is integrally formed, in particular with the diffusor being made of a one-piece fabric cloth. Apart from its function for directing gas, the diffusor in this case also fulfills the function of (at least) two reinforcing layers, resulting in the number of the individual components of the airbag being advantageously minimized.

The central cover portion of the diffusor can have (preferably on the edge side) a defined weakened zone where the central cover portion tears, when a predetermined material stress is reached. In this way, with little effort another discharge hole can be realized which forms in the diffusor, when the predetermined material stress is reached, and changes the further deployment of the airbag.

Incidentally, the invention comprises an airbag module including a gas generator, an airbag retaining element, a module bottom as well as an afore-described airbag, wherein fastening bolts are provided each of which extends through the aligned rear wall openings and diffusor fastening holes as well as fix at least the airbag retaining element and the airbag on the module bottom. Preferably, the gas generator is equally fixed on the module bottom by the fastening bolts, for example by clamping. Moreover, configuration variants are imaginable in which the airbag retaining element is integrated in the gas generator, and hence formed integrally with the gas generator.

Further, the invention also comprises a vehicle steering wheel including a steering wheel body and an afore-described airbag module, the airbag module being fastened on the steering wheel body, in particular using a detent connection.

In a vehicle steering wheel of this type, the diffusor can include exactly three connecting arms, wherein exactly three discharge holes are resulting between the connecting arms. Via the geometry of the connecting arms as well as the alignment and the size of the discharge holes, the airbag deployment can be specifically influenced and a desired deployment characteristic can be set with little effort.

Preferably, one of the discharge holes is disposed in the 6 o'clock area in a neutral position of the vehicle steering wheel for straight-ahead driving. In this lower steering wheel area, a distance from the vehicle occupant is small so that rapid and well-targeted airbag deployment in the 6 o'clock area appears to be advantageous in terms of the occupant safety.

Finally, the invention further comprises a method for manufacturing an afore-described airbag comprising the following method steps:
a) providing an airbag rear wall having plural rear wall openings and a flexible diffusor having plural connecting arms which include diffusor fastening holes at their free ends;
b) aligning the airbag rear wall and the connecting arms so that a rear wall opening is aligned with at least two diffusor fastening holes of adjacent connecting arms;
c) connecting the airbag rear wall to the connecting arms of the diffusor, in particular by a seam;
d) providing an airbag front wall and connecting said airbag front wall to the airbag rear wall, in particular by an edge-side peripheral circumferential seam.

The airbag rear wall is connected, in this method, quickly and easily to a flexible diffusor and, at the same time, is reinforced in the area of the airbag mouth by the diffusor connection. Therefore, additional separate reinforcing layers in the area of the airbag mouth can at least be reduced as to their number or can even be completely dispensed with, resulting in a particularly quick and simple airbag manufacture.

Optionally, between step c) and step d), an edge-side portion of a connecting arm can be connected to an edge-side portion of the central cover portion, in particular sewn up by a seam. In this way, the number and/or the size of the discharge holes of the diffusor can be reduced.

According to one method variant, the flexible diffusor is integrally formed and includes at least two connecting arms, wherein, in step c), all connecting arms are connected to the airbag rear wall.

In an alternative method variant, a connecting arm of the flexible diffusor is formed in two parts so that the diffusor includes a diffusor portion having at least one connecting arm and an arm projection as well as a separate arm portion with diffusor fastening holes, wherein, in step c), both all connecting arms of the diffusor portion and the separate arm portion are connected to the airbag rear wall.

In this method variant, preferably after step d), the arm projection and the separate arm portion are pulled outward through the airbag mouth and connected to each other, in particular using a diffusor seam.

As an alternative, in this method variant the arm projection and the separate arm portion can also be connected to each other prior to step d), in particular using a diffusor seam.

BRIEF DESCRIPTION OF THE DRAWINGS

Further features and advantages of the invention are evident from the subclaims and from the following description of preferred embodiments with reference to the drawings, wherein:

FIGS. 4 to 7 show schematic sketches for manufacturing an airbag according to the invention comprising a diffusor as set forth in a first embodiment;

FIGS. 12 to 15 show schematic sketches for manufacturing an airbag according to the invention comprising a diffusor as set forth in a third embodiment.

DESCRIPTION

Figure 1:
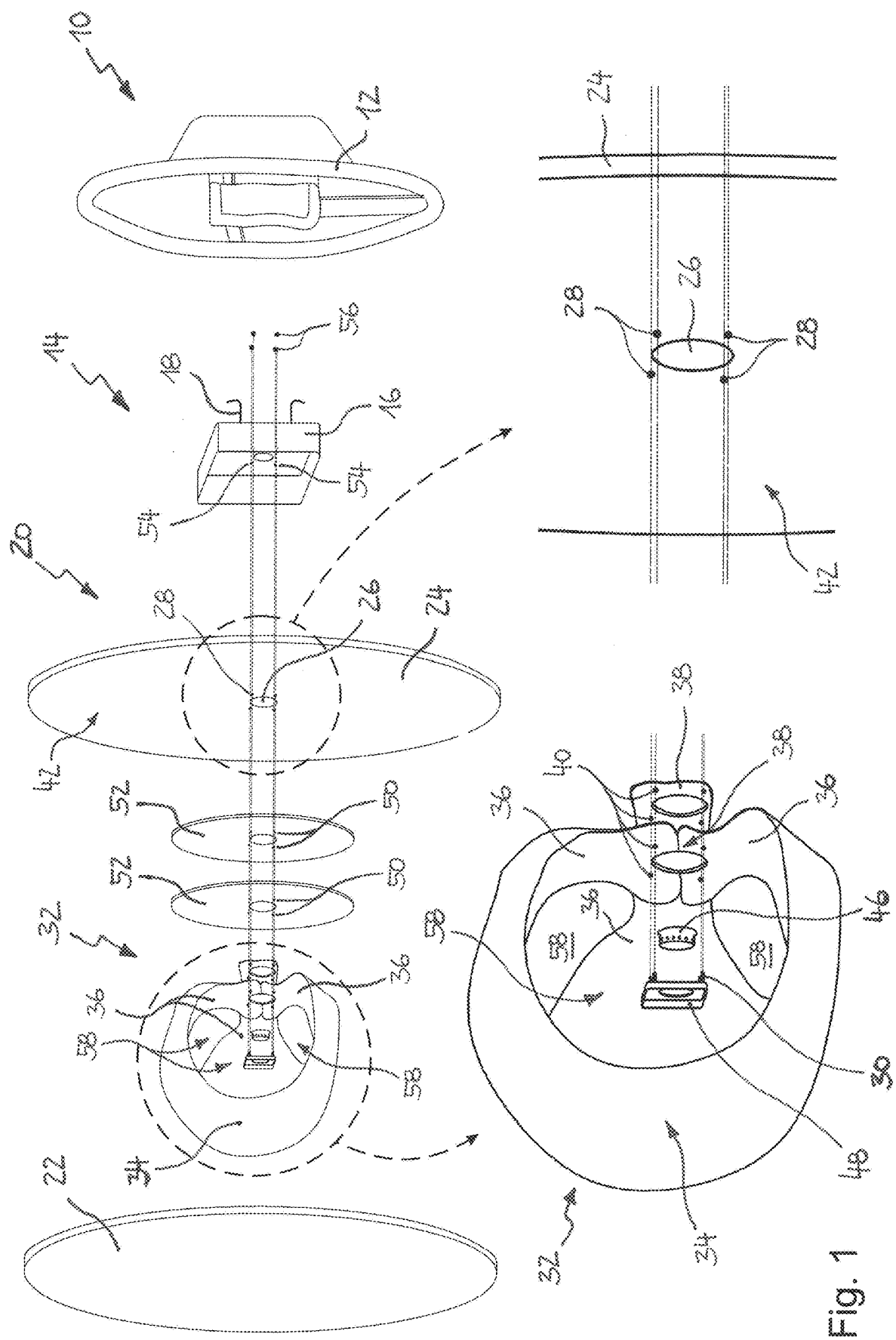
FIG. 1 shows a schematic exploded view of a vehicle steering wheel comprising an airbag module and an airbag according to the invention.

FIG. 1 illustrates a schematic exploded view of a vehicle steering wheel 10 comprising a steering wheel body 12 and an airbag module 14 adapted to be fastened to the steering wheel body 12. In the illustrated embodiment, for this purpose detent hooks 18 which, during assembly of the module, engage in a spring element (not shown) arranged on the steering wheel body 12 are indicated on a module bottom 16 of the airbag module 14, wherein alternatively the detent hooks 18 can also be provided on the steering wheel body 12 and the spring element can correspondingly be provided on the module bottom 16, of course.

An airbag 20 of the airbag module 14 comprises, according to FIG. 1, an airbag front wall 22 which, in the inflated state of the airbag 20, faces a vehicle occupant 23, an opposite airbag rear wall 24 which includes an airbag mouth 26 for inflating the airbag 20 and plural rear wall openings 28 distributed around the airbag mouth 26 for receiving fastening bolts 30, and a flexible diffusor 32 which has a central cover portion 34, as well as plural connecting arms 36 each extending from the central cover portion 34 to a free end 38, the free ends 38 of the connecting arms 36 including diffusor fastening holes 40 for receiving fastening bolts 30.

The free ends 38 of the connecting arms 36 are disposed on an inner face 42 of the airbag rear wall 24 so that the diffusor fastening holes 40 are aligned with the rear wall openings 28 and two respective diffusor fastening holes 40 of different overlapping connecting arms 36 come to lie on each rear wall opening 28 (see FIG. 1, magnified cutouts), wherein the connecting arms 36 overlapping in the area of a rear wall opening 28 are connected tightly to each other and tightly to the airbag rear wall 24, specifically by a seam 44 (see FIG. 6).

Figure 2:
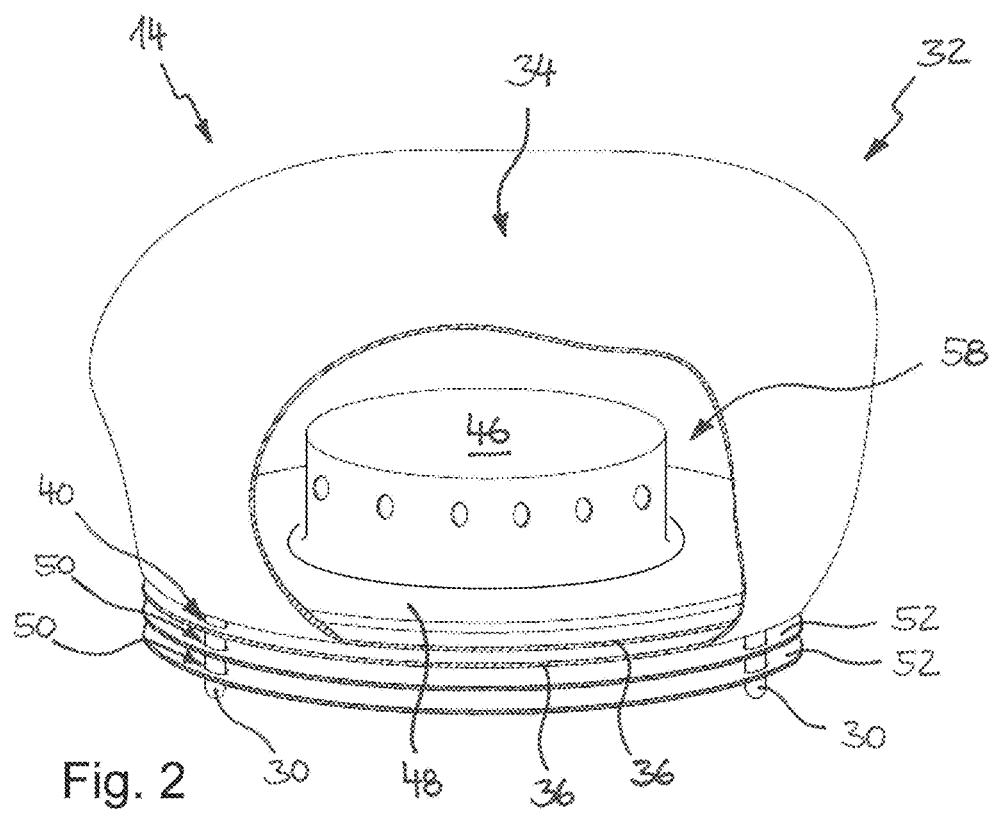
FIG. 2 shows a schematic partial view of the airbag module according to the invention from FIG. 1 in the area of the diffusor.

In addition to the airbag 20, the airbag module 14 includes a gas generator 46, an airbag retaining element 48 and the module bottom 16, wherein furthermore fastening bolts 30 are provided which are indicated in FIGS. 1 and 2 and are rigidly arranged on the airbag retaining element 48 in the shown embodiment. Starting from the airbag retaining element 48, the fastening bolts 30 extend initially through two respective diffusor fastening holes 40, where necessary through holes 50 of optionally provided reinforcing layers 52, after that through rear wall openings 28 of the airbag rear wall 24 and bottom openings 54 of the module bottom 16, before bolt nuts 56 are finally screwed on. Thus, at least the airbag retaining element 48 and the airbag 20 (including the diffusor 32) are fixed on the module bottom 16 by the bolts 30.

In the shown embodiment, a flange of the gas generator 46 is clamped between the airbag retaining element 48 and the module bottom 16 so that the gas generator 46 is also fixed on the module bottom 16 by the fastening bolts 30.

As an alternative, also configuration variants in which the gas generator 46 and the airbag retaining element 48 are formed integrally are imaginable.

FIG. 2 illustrates the airbag module 14 according to FIG. 1 in the area of the diffusor 32, wherein the airbag retaining element 48 is slipped over the gas generator 46 and each fastening bolt 30 of the airbag retaining element 48 has already been threaded into two diffusor fastening holes 40 as well as into two holes 50 of the two additional reinforcing layers 52.

This design of the diffusor in combination with the seam 44 replaces already two separate reinforcing layers 52. Ideally, the integrated reinforcement is sufficient already to completely dispense with separate reinforcing layers 52. Depending on the respective marginal conditions of the airbag module 14, such as the volume of the airbag 20 or the airbag fabric used, material stress that requires additional separate reinforcing layers 52 may occur in the area of the airbag mouth 26, however, when the airbag module 14 is activated. In accordance with FIGS. 1 and 2, two additional separate reinforcing layers 52 are exemplified.

Figure 3:
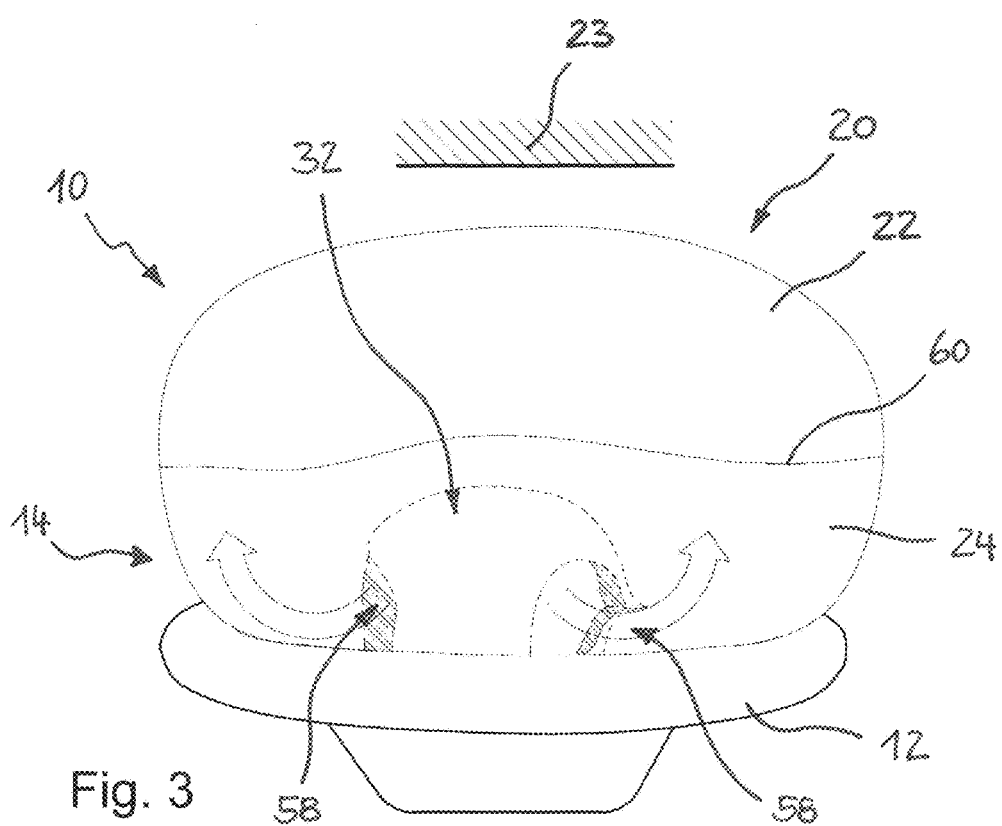
FIG. 3 shows a schematic view of the vehicle steering wheel according to the invention from FIG. 1 in the assembled state during airbag deployment.

FIG. 3 illustrates the vehicle steering wheel 10 shown in FIG. 1 during deployment of the airbag 20, wherein the airbag rear wall 24 is shown to be transparent so that the inboard diffusor 32 with an indicated gas flow can be recognized. In combination with FIGS. 1, 2, 4 and 5, it becomes clear that the diffusor 32 in this embodiment includes exactly three connecting arms 36, wherein between the connecting arms 36 exactly three discharge holes 58 for generator gas are formed, wherein the discharge holes 58 may be substantially evenly distributed in the circumferential direction, i.e., at an angle of about 120° (see FIG. 5). Moreover, the airbag 20 is mounted in the vehicle steering wheel 10 specifically in such a way that one of the discharge holes 58 is arranged in a neutral position of the vehicle steering wheel 10 for straight-ahead driving in the 6 o'clock area.

FIGS. 4 and 5 illustrate a first embodiment of the flexible diffusor 32 in a flatly spread state and, resp., in a mounting state folded or collapsed at indicated fold lines 59. The diffusor 32 is formed integrally in this case and is particularly made from a one-piece fabric cloth.

In the following, a method for manufacturing the airbag 20 is described based on FIGS. 4 to 7.

In a method step a), at first the airbag rear wall 24 having plural rear wall openings 28 (see FIG. 1) and the flexible diffusor 32 having plural connecting arms 36 are provided, the connecting arms 36 including diffusor fastening holes 40 at their free ends 38 (see FIGS. 4 and 5).

Subsequently, in a method step b), the airbag rear wall 24 and the connecting arms 36 are aligned relative to each other so that each of the rear wall openings 28 is aligned with at least two diffusor fastening holes 40 of adjacent connecting arms 36 (see FIG. 1).

The airbag rear wall 24 is then connected, in a method step c), to the connecting arms 36 of the diffusor 32 by a seam 44 (see FIG. 6).

As illustrated already in the foregoing by means of FIGS. 4 and 5, the flexible diffusor 32 is formed integrally in this embodiment and includes exactly three connecting arms 36, wherein, in step c), all connecting arms 36 are connected to the airbag rear wall 24.

As is clear from the magnified cutout of FIG. 6, the connecting arms 36 and the airbag rear wall 24 are connected by one single seam 44 in this case, said seam 44 completely enclosing the airbag mouth 26. In order to further reinforce the airbag connection and, in particular, to prevent the rear wall openings 28 and the diffusor fastening holes 40 from tearing out, when the airbag module 14 has been activated, the seam 44 is configured in this case such that, in addition, it encloses also each of the rear wall openings 28 (and, thus, also each of the aligned diffusor fastening holes 40) individually.

In a method step d), ultimately the airbag front wall 22 shown to be transparent in FIG. 7 is provided and is connected to the airbag rear wall 24, in particular by a circumferential seam 60 around the edge.

The configuration of the diffusor 32 according to FIGS. 1 to 7 is of particular advantage, because, by clever design and connection of one single fabric cloth, both a diffusor function and a reinforcement of the airbag 20 in the area of the airbag mouth 26 can be realized, the reinforcement replacing at least two conventional separate reinforcing layers. Ideally, the diffusor 32 is connected by one single seam 44 in a particularly time and cost saving manner.

Figure 8:
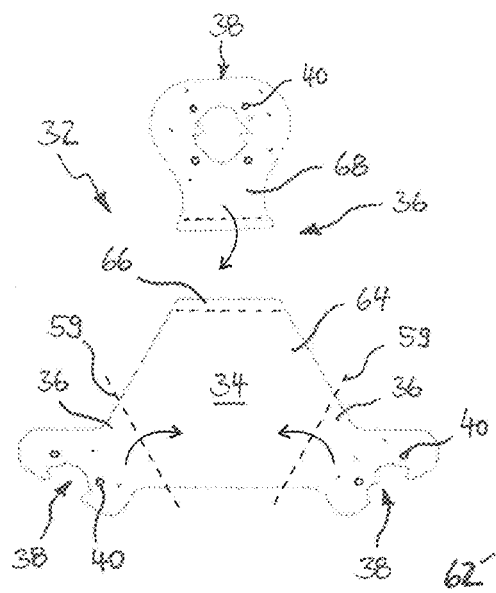
FIGS. 8 to 11 show schematic sketches for manufacturing an airbag according to the invention comprising a diffusor as set forth in a second embodiment.
Figure 9:
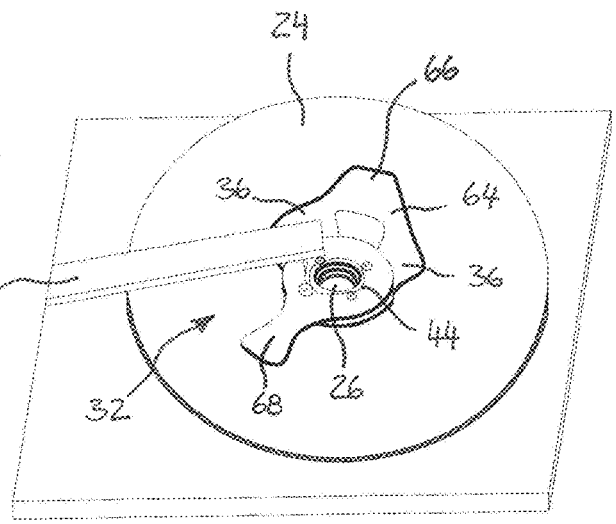

However, in this configuration of the diffusor 32 it is a challenge to produce the seam 44. As indicated in FIG. 6, the sewing machine must have a particularly slender sewing arm 62 which must be inserted into a later discharge hole 58 between two adjacent connecting arms 36 of the diffusor 32. If this is not possible due to the size of the diffusor 32 and/or the constructional design of the sewing machine, a second two-part configuration of the diffusor 32 according to FIG. 8 and a manufacturing method for the airbag 20 as indicated in FIGS. 9 to 11 is suggested.

Concretely, a connecting arm 36 of the flexible diffusor 32 has a two-part design so that the diffusor 32 includes a diffusor portion 64 having two connecting arms 36 and an arm projection 66 as well as a separate arm portion 68 with diffusor fastening holes 40, wherein, in view of the aforedescribed manufacturing method for the airbag 20, in step c) both all connecting arms 36 of the diffusor portion 64 and the separate arm portion 68 are connected, specifically sewn, to the airbag rear wall 24. In this case, a respective rear wall opening 28 is aligned with a diffusor fastening hole 40 of a connecting arm 36 of the diffusor portion 64 and a diffusor fastening hole 40 of the separate arm portion 68 (see FIG. 9).

Figure 10:
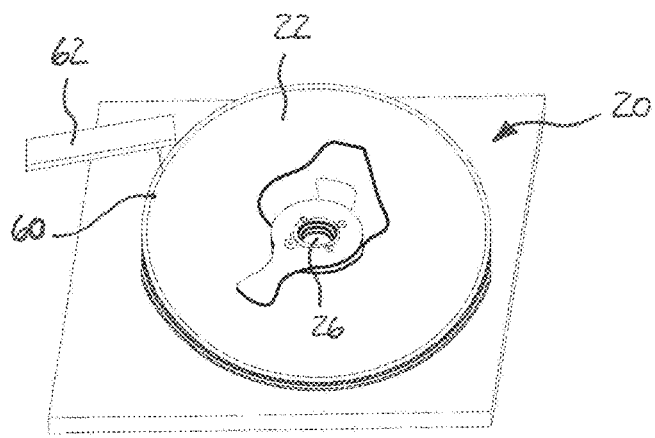

According to FIG. 10, in step d) then the transparently shown airbag front wall 22 is provided and is connected to the airbag rear wall 24, in particular by a circumferential seam 60 around the edge.

Figure 11:
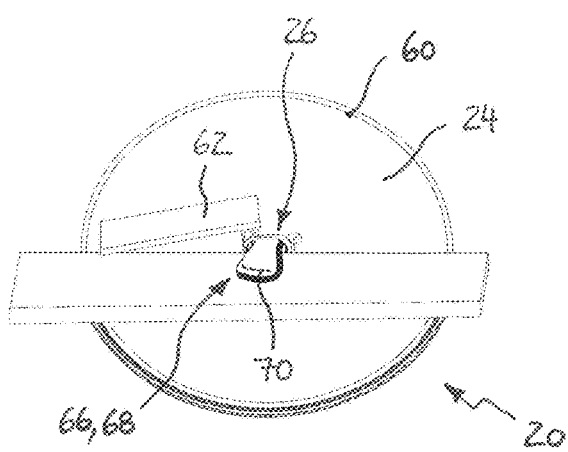

After said step d), ultimately the arm projection 66 and the separate arm portion 68 are pulled outward through the airbag mouth 26 and are connected to each other, in particular by a diffusor seam 70 (see FIG. 11).

As an alternative, also a method variant is imaginable, however, in which the arm projection 66 and the separate arm portion 68 are connected to each other by the diffusor seam 70 after the method step c) but prior to the method step d).

FIG. 12 illustrates the diffusor 32 according to a third embodiment in which the diffusor 32 is formed integrally analogously to the FIGS. 4 to 7, but has only two connecting arms 36. The airbag 20 is manufactured similarly to the afore-described embodiments of the diffusor 32. The airbag rear wall 24 and the connecting arms 36 are again at first oriented such that a rear wall opening 28 is aligned with two diffusor fastening holes 40 of adjacent connecting arms 36, before in step c) the airbag rear wall 24 is connected to the connecting arms 36 of the diffusor 32 (see FIG. 13) and, in step d), finally the airbag front wall 22 is connected to the airbag rear wall 24 (see FIG. 15).

As a special feature, however, in this embodiment of the diffusor 32, between step c) and step d), an edge-side portion of one connecting arm 36 is connected to an edge-side portion of the central cover portion 34 by a seam 72 (see FIG. 14).

This seam 72 helps reduce the size and/or the number of the discharge holes 58 of the diffusor 32. In the shown embodiment according to FIGS. 12 to 15, the diffusor 32 has two discharge holes 58 for generator gas which are indicated by two arrows in FIG. 15. In this case, the airbag 20 is mounted in the vehicle steering wheel 10 particularly so that the discharge holes 58 are disposed, in a neutral position of the vehicle steering wheel 10 for straight-ahead driving, approximately in the 5 o'clock area and in the 7 o'clock area (see also FIG. 17).

As illustrated in FIG. 12, the central cover portion 34 of the diffusor 32 in this embodiment has a defined weakened zone 74 on the edge side at which the central cover portion 34 tears upon reaching a predetermined material stress. Said weakened zone 74 is a linear fabric perforation of the diffusor 32, for example, which tears after activation of the airbag module 14, when a predetermined gas pressure is reached, and releases another discharge hole 58. In the shown embodiment, the weakened zone 74 is arranged so that the further discharge hole 58 for generator gas is formed in a neutral position of the vehicle steering wheel 10 for straight-ahead driving approximately in the 12 o'clock area (see also FIG. 17, dashed arrow). In this way, after activation of the airbag module 14 a somewhat delayed airbag deployment can be realized in the 12 o'clock area, for example.

Since the seam 72 is made only after connecting the airbag rear wall 24 to the connecting arms 36, the sewing arm 62 can better access the seam 44 in this embodiment of the diffusor 32 and, thus, the seam 44 can be made more easily than in the first embodiment according to FIGS. 4 to 7. Nevertheless, also in a diffusor design 32 according to FIG. 12 a two-part construction is imaginable, of course, as is illustrated in FIG. 16.

Figure 16:
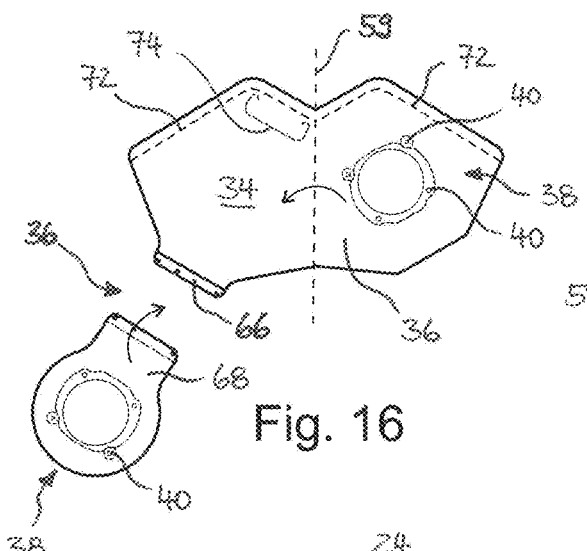
FIGS. 16 to 21 show schematic sketches for manufacturing an airbag according to the invention comprising a diffusor as set forth in a fourth embodiment.
Figure 17:
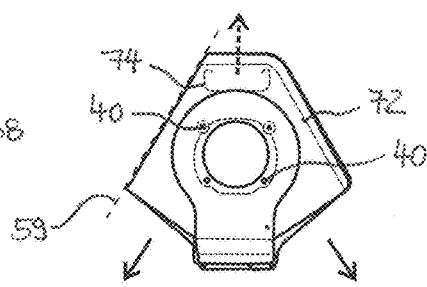
Figure 18:
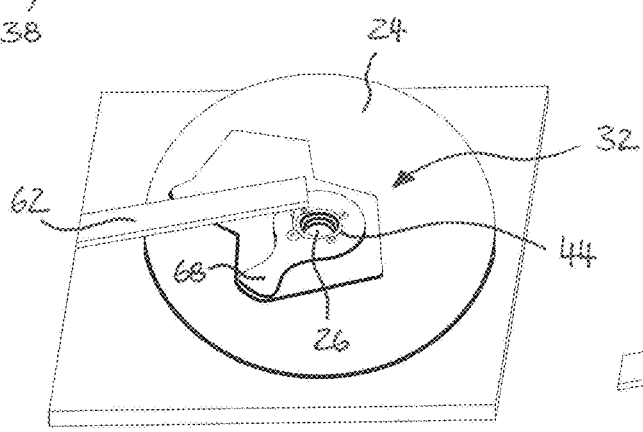

FIGS. 16 and 17 illustrate a fourth embodiment of the flexible diffusor 32 in a flatly spread state and, resp., in a folded or collapsed mounting state. A corresponding manufacturing method for the airbag 20 is indicated in FIGS. 18 to 21.

Analogously to the second embodiment according to FIGS. 8 to 11, a connecting arm 36 of the flexible diffusor 32 has a two-part design so that the diffusor 32 includes a diffusor portion 64 having a connecting arm 36 and an arm projection 66 as well as a separate arm portion 68 with diffusor fastening holes 40, wherein, in view of the above-described manufacturing method for the airbag 20, in step c) both the connecting arm 36 of the diffusor portion 64 and the separate arm portion 68 are connected, specifically sewn, to the airbag rear wall 24. In so doing, a respective rear wall opening 28 is aligned with each of a diffusor fastening hole 40 of the connecting arm 36 of the diffusor portion 64 and a diffusor fastening hole 40 of the separate arm portion 68 (see FIG. 18).

Figure 19:
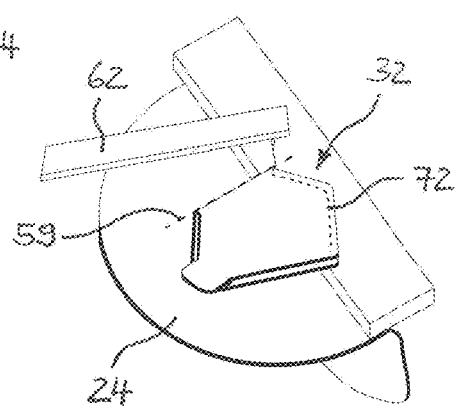
Figure 20:
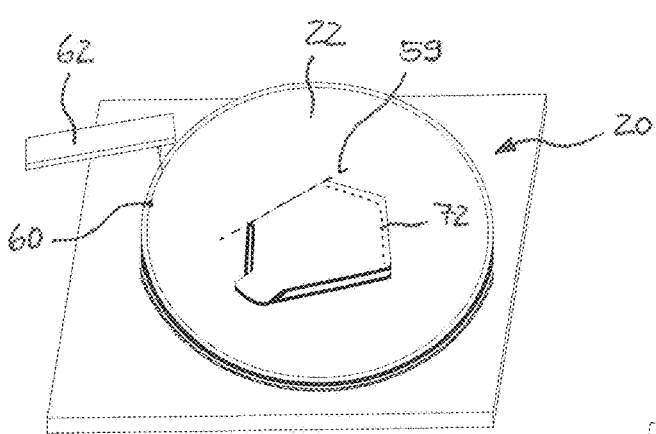

In accordance with FIG. 19, the edge-side portion of the connecting arm 36 is then connected, preferably sewn by the seam 72, to the edge-side portion of the central cover portion 34, before in step d) the airbag front wall 22 is provided and connected to the airbag rear wall 24 by a circumferential seam 60 around the edge, as illustrated in FIG. 20.

Figure 21:
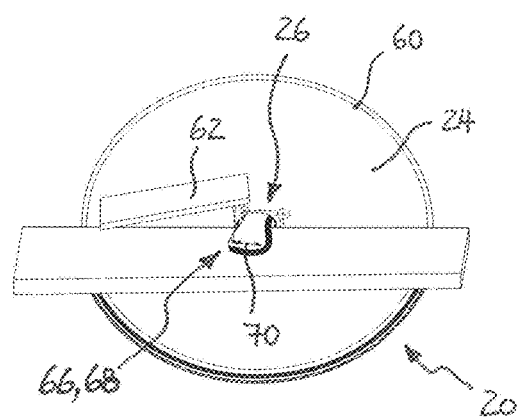

After said step d), ultimately the arm projection 66 and the separate arm portion 68 are pulled outward through the airbag mouth 26 and are connected to each other, particularly by the diffusor seam 70 (see FIG. 21).

As an alternative, however, also in this case a method variant is imaginable in which the arm projection 66 and the separate arm portion 68 are connected to each other, particularly by the diffusor seam 70, prior to the method step d).

The invention claimed is:

1. An airbag for a vehicle occupant restraint system, comprising
    an airbag rear wall which includes an airbag mouth for inflating the airbag as well as plural rear wall openings distributed around the airbag mouth for receiving fastening bolts, and
    a flexible diffusor which includes a central cover portion, as well as plural connecting arms each of which extends from the central cover portion to a free end,
    wherein the free ends of the connecting arms include diffusor fastening holes for receiving the fastening bolts,
    wherein the free ends of the connecting arms are disposed on an inner face of the airbag rear wall so that the diffusor fastening holes are aligned with the rear wall openings and two respective diffusor fastening holes of different overlapping connecting arms come to lie on each rear wall opening, and
    wherein the overlapping connecting arms are connected tightly to each other and tightly to the airbag rear wall in the areas where the diffuser fastening holes are aligned with the rear wall openings, and wherein the connecting arms and the airbag rear wall are connected by one single seam, the seam surrounding the airbag mouth.

2. The airbag according to claim 1, wherein in addition the seam individually encloses at least one of the rear wall openings.

3. The airbag according to claim 1, wherein the flexible diffusor is made of a one-piece fabric cloth.

4. The airbag according to claim 1, wherein the central cover portion has a defined weakened zone where the central cover portion tears when a predetermined material stress is reached.

5. An airbag module comprising a gas generator, an airbag retaining element, a module bottom and an airbag according to claim 1, wherein the airbag module further comprises the fastening bolts which extend through the rear wall openings and the diffusor fastening holes, wherein the fastening bolts fix at least the airbag retaining element and the airbag to the module bottom.

6. A vehicle steering wheel comprising a steering wheel body and an airbag module according to claim 5, wherein the airbag module is fastened on the steering wheel body.

7. The vehicle steering wheel according to claim 6,
    wherein the diffusor includes exactly three connecting arms, wherein exactly three discharge holes are formed between the connecting arms.

8. The vehicle steering wheel according to claim 7, wherein, in a neutral position of the vehicle steering wheel for straight-ahead driving, one of the discharge holes is arranged in the 6 o'clock area.

9. A vehicle steering wheel comprising a steering wheel body and an airbag module according to claim 6, wherein the airbag module is fastened on the steering wheel body by a detent connection.

10. A method for manufacturing an airbag according to claim 1, wherein by the following method steps:
    a) providing the airbag rear wall having the plural rear wall openings and the flexible diffusor having the plural connecting arms which, at their free ends, include the diffusor fastening holes;

b) orienting the airbag rear wall and the connecting arms so that the rear wall openings are aligned with at least two diffusor fastening holes of adjacent connecting arms;
c) connecting the airbag rear wall to the connecting arms of the diffusor;
d) providing an airbag front wall and connecting said airbag front wall to the airbag rear wall.

11. The method according to claim 10, wherein, between step c) and step d), an edge-side portion of one of the connecting arms is connected, to an edge-side portion of the central cover portion.

12. The method according to claim 11, wherein the edge-side portion of the one of the connecting arms is connected to the edge-side portion of the central cover portion by sewing.

13. The method according to claim 10, wherein the flexible diffusor is integrally formed and has at least two connecting arms, wherein, in step c), all connecting arms are connected to the airbag rear wall.

14. The method according to claim 10, wherein-a one of the connecting arms of the flexible diffusor is configured in two parts as a two-piece arm comprising a diffusor portion and a separate arm portion, wherein the diffusor portion includes at least one connecting arm and an arm projection, wherein the separate arm portion includes the diffusor fastening holes of the two-piece arm, and wherein, in step c), the at least one connecting arm of the diffusor portion as well as the separate arm portion are connected to the airbag rear wall.

15. The method according to claim 14, wherein, after step d), the arm projection and the separate arm portion are pulled outward through the airbag mouth and are connected to each other.

16. The method according to claim 14, wherein, prior to step d), the arm projection (66) and the separate arm portion (68) are connected to each other.

* * * * *